US006772652B2

(12) United States Patent
Cronimus

(10) Patent No.: US 6,772,652 B2
(45) Date of Patent: Aug. 10, 2004

(54) CLOSING DEVICE FOR VALVE WITH INTERIOR HOUSING FOR PROBE ALLOWING PROBE TO BE REMOVED WITHOUT DISASSEMBLY

(75) Inventor: Georges Cronimus, Gumbrechtshoffen (FR)

(73) Assignee: De Dietrich Process Systems, Zinswiller (FR)

( * ) Notice: Subject to any disclaimer, the term of this patent is extended or adjusted under 35 U.S.C. 154(b) by 189 days.

(21) Appl. No.: 10/066,202

(22) Filed: Feb. 1, 2002

(65) Prior Publication Data

US 2002/0104568 A1 Aug. 8, 2002

(30) Foreign Application Priority Data

Feb. 2, 2001 (FR) .............................................. 01 01417

(51) Int. Cl.[7] .............................................. F16K 37/00
(52) U.S. Cl. ...................................................... 73/866.5
(58) Field of Search ............................... 73/866.5, 714, 73/756; 374/141, 147, 148

(56) References Cited

U.S. PATENT DOCUMENTS

| 3,555,414 A | | 1/1971 | Deichelmann ................ 324/54 |
| 3,938,544 A | | 2/1976 | Bernaerts ........................ 73/46 |
| 4,575,262 A | * | 3/1986 | Andersen ..................... 374/147 |
| 4,598,581 A | * | 7/1986 | Brekke ......................... 73/596 |
| 4,822,570 A | | 4/1989 | Lerman et al. .............. 422/119 |
| 5,320,137 A | * | 6/1994 | Huang ......................... 374/147 |

* cited by examiner

Primary Examiner—Robert Raevis
(74) Attorney, Agent, or Firm—Davis & Bujold PLLC

(57) ABSTRACT

The closing device (16) moves between a position that opens a valve and a position that closes a valve (14), which is specifically a drainage valve used on a chemical reactor (1), a storage vat, a column or other container, and it comprises an interior housing (30) designed to hold a measurement or detection probe (27). It has an opening (38) that is accessible when it is in the operating position inside the valve and which provides access to its interior housing, allowing the probe to be inserted or removed without the need for prior disassembly of either the valve or the closing device. This invention is of interest to the chemical industry, particularly manufacturers and users of temperature measurement devices.

20 Claims, 6 Drawing Sheets

CLOSING DEVICE FOR VALVE WITH INTERIOR HOUSING FOR PROBE ALLOWING PROBE TO BE REMOVED WITHOUT DISASSEMBLY

FIELD OF THE INVENTION

The present invention concerns a device for closing a valve comprising an interior housing with an access opening for inserting or removing the probe of a measurement or detection apparatus, for example, a temperature measurement probe, without the need of disassembling either the closing device or the valve, while permitting the valve to remain closed.

Although not limited in scope to such use, the closing device of the invention is preferably intended for a drainage valve of a reactor, a storage vat, a column, or other container.

BACKGROUND OF THE INVENTION

In order to control a chemical reaction, it is often essential to measure the temperature of the reactive environment inside the reactor. Not only does this information make it possible to retroactively adjust the means for heating or cooling the reactor to attain or maintain the desired temperature, but it also ensures that the chemical reaction is proceeding properly. In practice, a sharp rise in temperature often signifies that the reaction has gone awry, and quick detection of such a situation may be critical for the safety of employees, equipment, and the environment.

For this reason, reactors or other chemical containers are often equipped with a device for measuring the temperature of their contents.

SUMMARY OF THE INVENTION

In order to avoid problems with seals, construction and cost in conventional temperature measurement systems that use a penetrating probe surrounded by a thermometric casing placed in a supplemental tube in the reactor, the prior art has proposed a more satisfactory measurement device using a contact measurement probe.

With this device the temperature probe is maintained in contact with a locally thinned area of the reactor wall and it measures content temperature through the wall. This eliminates the need to form an opening extending into the core of the reactor.

In a conventional system, this contact temperature probe is often placed at the level of the reactor drainage valve. Therefore, it is mounted inside the closing device on the drainage valve, said device being movable between an upper position and a lower position corresponding to the opening and closing the valve, respectively.

The probe may be integrated with the interior of the blocking head of the closing device near its upper wall during construction, or it may be housed within a hollow interior portion in the blocking head against the internal surface of its upper wall. The conductive wires, connecting the probe to the measurement device, generally pass through the shaft of the closing device.

This location confers the following advantages:

First, it uses a previously existing opening in the reactor. Thus, no costly reactor modifications are necessary. Only the valve closing device needs to be adapted, which is far less expensive.

Second, since the drainage valve constitutes the lowest point on the container, the probe is always surrounded by liquid, whatever the level of liquid in the container. It is located in an area far away from thermal surface flux and in a place where the reactive environment is homogeneous, since it is generally well mixed by an agitator. Moreover, since the blocking head extends slightly inside the reactor, the temperature being measured is not artificially raised or lowered by proximity to the outside environment or the double wall sometimes used. Thus, the temperature that is measured is representative of the temperature of the entire reactor contents.

Due to the development of ISO-type quality controls, these temperature probes must meet new requirements. They must be adjusted regularly, requiring removal from their operating position inside the reactor.

In prior art systems, this frequent removal is problematic. In order to remove the probe from its placement, it is actually necessary to completely disassemble the drainage valve in order to remove the closing device surrounding the probe. Obviously, the reactor must be completely emptied prior to performing these operations.

For this reason, a simple recalibration of the temperature measurement probe becomes synonymous with one to two days of lost productivity while the reactor is completely emptied and cleaned, the drainage valve and its seal are removed, as well as the measurement probe, all in compliance with safety standards; next, the probe must be recalibrated, the various elements reattached, and the reactor refilled, before production can resume. For these reasons, a simple, routine operation becomes extremely costly and unprofitable to the industry.

The goal of the present invention is to offer ready access from the exterior to the temperature measurement probe positioned inside the movable closing device on the drainage valve, and to quickly and easily remove and reposition it without detaching the valve and the seal and without interfering with the progress of the reaction inside the reactor.

To resolve this technical problem, the principle of the invention consists of providing a valve closing device, particularly for a drainage valve, with an interior housing designed to hold the probe or the detector of a measurement or detection apparatus, having an opening located on a portion of the closing device that is accessible when it is in the operating position inside the valve, providing access to the interior housing, and allowing insertion or removal of the probe or the detector without having previously detached the valve or its closing device.

A contact temperature measurement probe with a flexible shaft can thus be easily introduced into the interior housing of the closing device of the invention through this access opening, until it contacts the upper wall of the blocking head of the closing device, which is preferably a thinner portion, through which it measures the temperature of the reactive environment.

In the same way, it can be simply and quickly withdrawn for if, for example, replacement, adjustment or calibration is required, with no effect on the reactor's contents and without any need to detach or re-attach the valve or its closing device.

The device of the invention is, therefore, especially advantageous because it saves valuable time but still uses a conventional temperature measuring contact probe located within the closing mechanism of the drainage valve.

The closing device of the invention is easily manufactured and scarcely more expensive than prior art closing devices. It can be attached to any type of valve, either a drainage valve or some other type, and used on any type of reactor, columns, storage vats, containers or the like. Furthermore, most types of existing measurement or detection contact probes may be easily adapted to it.

BRIEF DESCRIPTION OF THE DRAWINGS

Other characteristics and features of the invention will be apparent from the following detailed description, with reference to the attached drawings, in which.

DETAILED DESCRIPTION OF THE INVENTION

Figure 1:
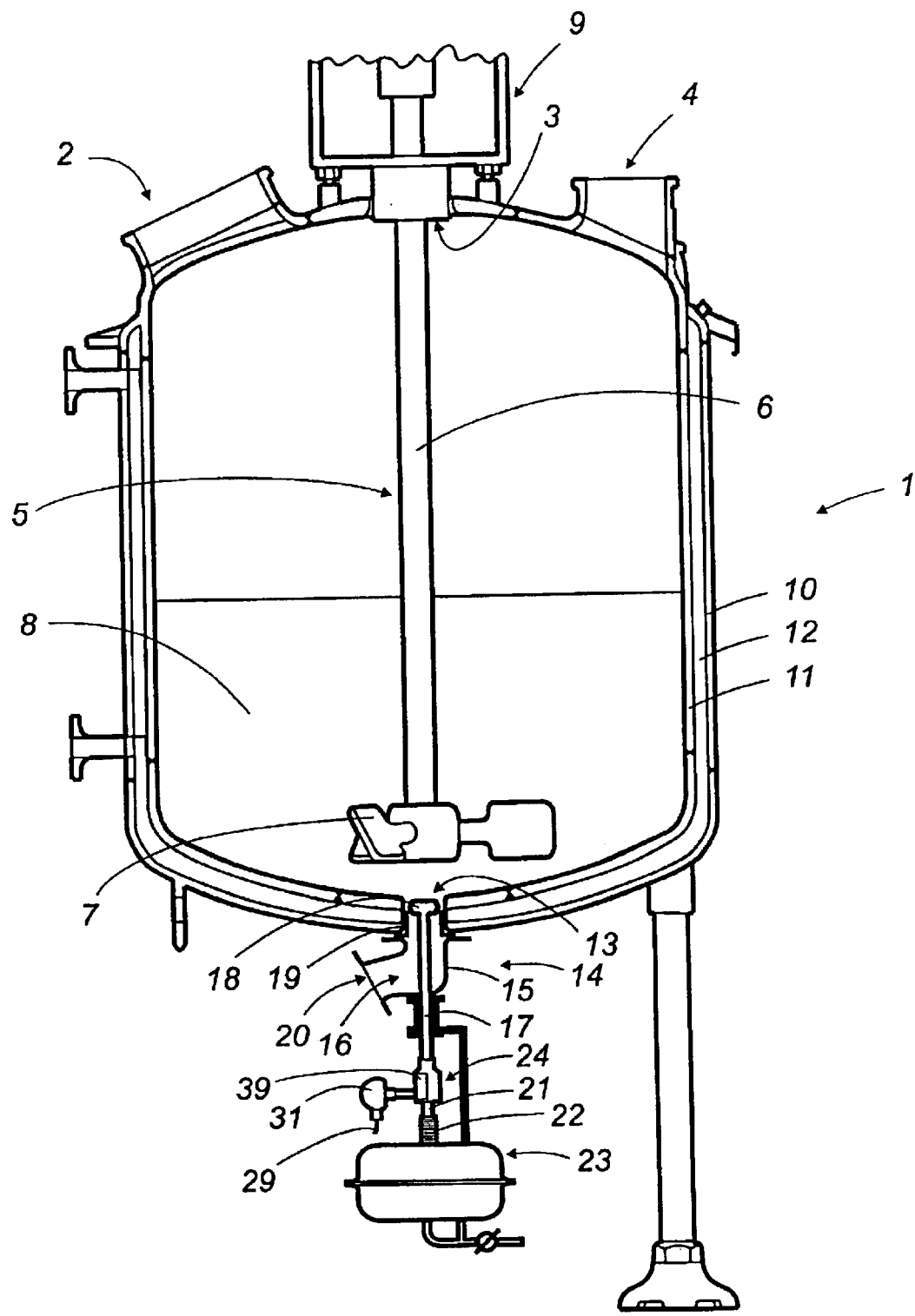
FIG. 1 is a longitudinal cross-section of the chemical reactor system with a drainage valve equipped with the closing device of the invention.

The closing device of the present invention will now be described in detail with reference to FIGS. 1 through 6 showing a preferred embodiment of the invention. Equivalent elements in different drawings will bear the same reference numerals.

The first drawing is a schematic illustration of a chemical reactor 1 with three upper openings 2, 3 and 4 that may be used to introduce various reagents, solvents and catalysts, or to admit various instruments or accessories into reactor 1 (agitator, mole, probe, gripping devices).

Reactor 1 is equipped with a mechanical agitator 5 having a shaft 6 traversing central opening 3 and extending toward the lower portion of the reactor. Shaft 6 terminates in a unit of three angled blades 7 agitating the contents 8 of reactor 1 when the shaft is rotated by a drive motor 9 located outside the reactor.

A second wall 10 may surround internal wall 11 of reactor 1 at a certain distance from it so as to form a closed space 12 between the two walls that receives heating or cooling fluid for regulating the internal temperature of the reactor according to the well-known dual envelope principle.

In order to resist the effects of a highly corrosive reactive environment 8, the internal surface of reactor 1, as well as all surfaces that may come into contact with this reactive environment, may possibly be coated with a protective layer of enamel.

In the usual way, reactor 1 has at its lowest point an opening 13 equipped with a drainage valve 14, for example, a flap valve, for emptying the entire reactor contents.

Drainage valve 14 has a fixed valve body 15 and a closing device 16 that moves inside the valve body between an upper position for opening drainage valve 14 and a lower position for closing it. Closing device 16 comprises a shaft 17 and a blocking head 18.

Figure 2:
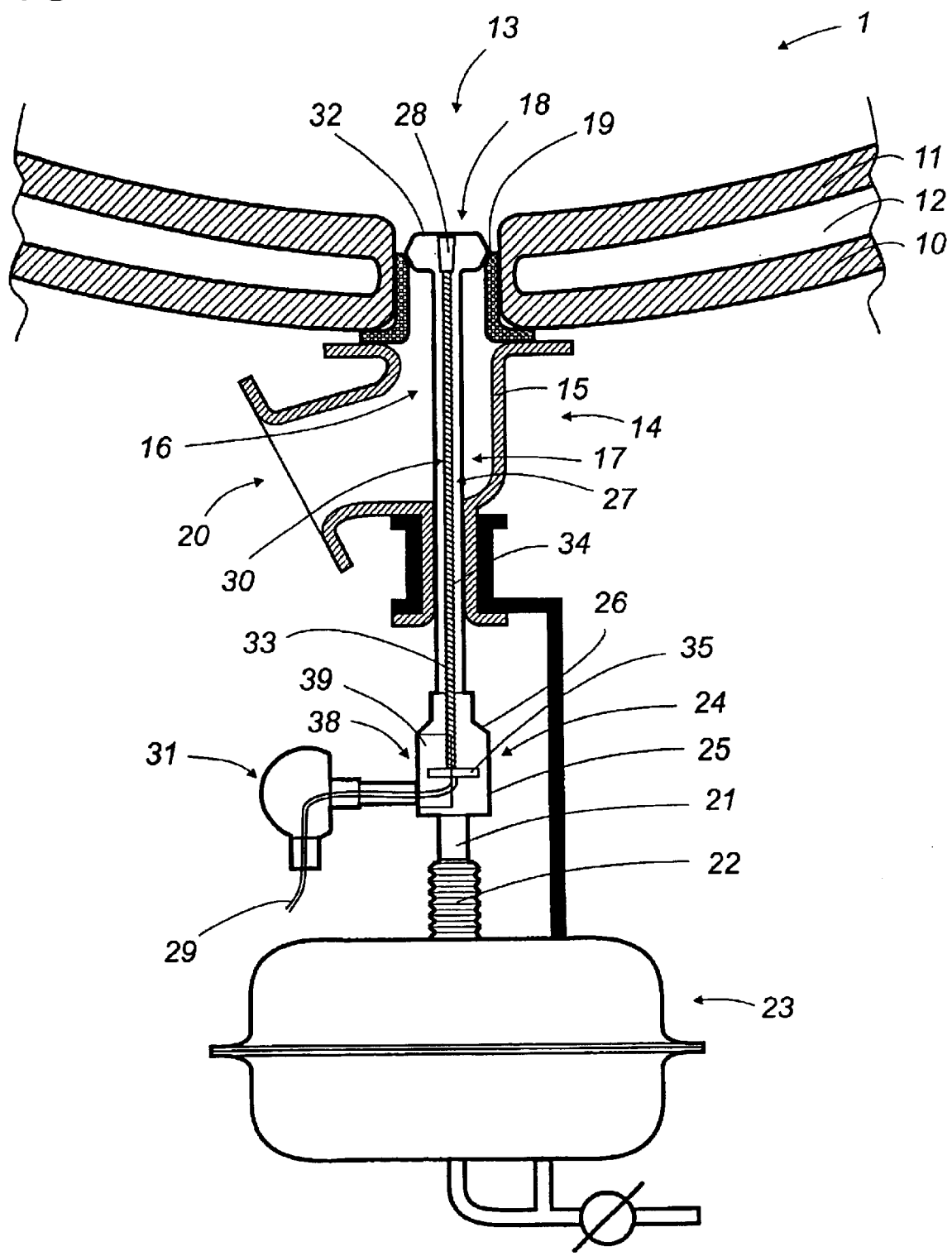
FIG. 2 is an enlarged longitudinal cross-section of the lower portion of the reactor of FIG. 1, with a more detailed illustration of the drainage valve and its movable closing device surrounding a temperature measurement probe that can be extracted without disassembling the valve of the invention.
Figure 3:
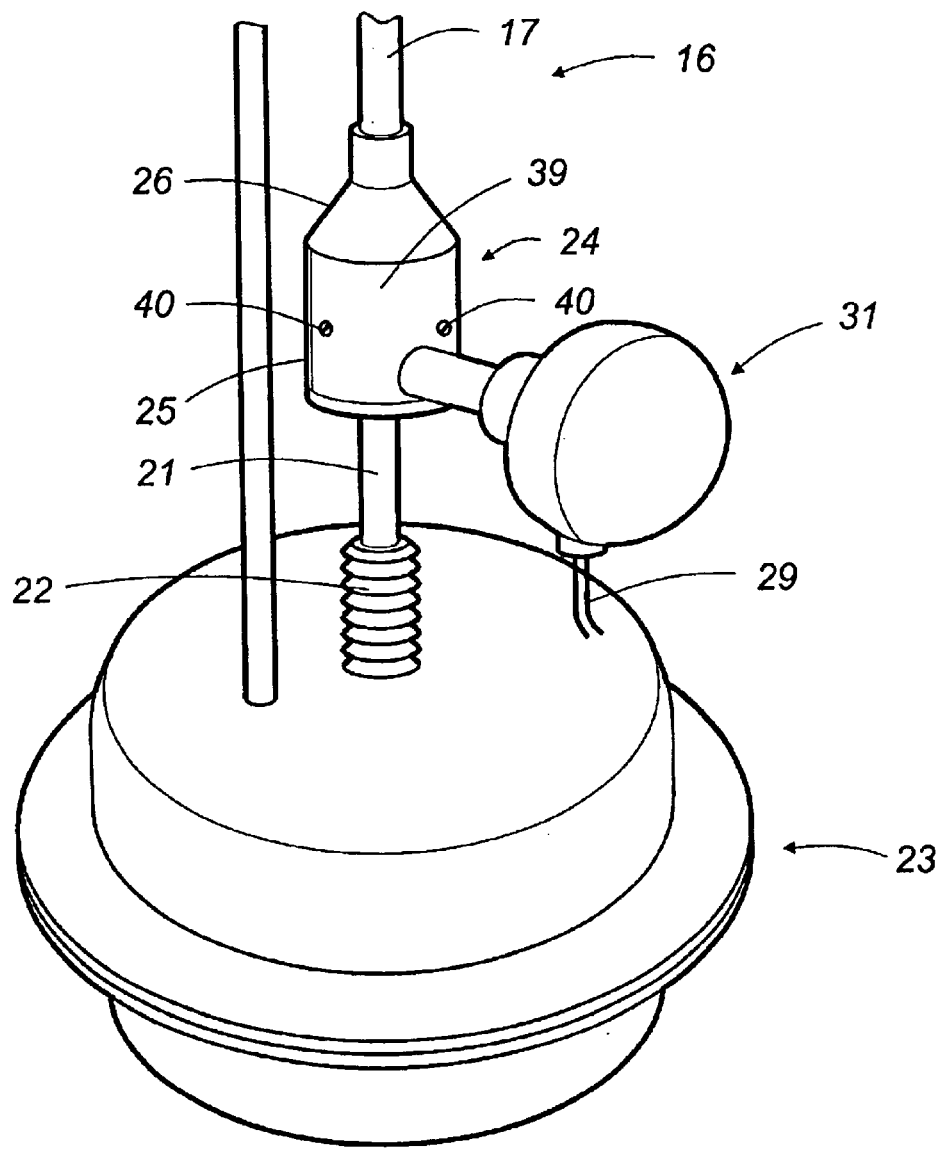
FIGS. 3 through 6 are schematic perspective views of the lower portion of the closing device of the invention showing the various stages during extracting the measurement probe without disassembling the valve: the lateral access door on the closing device is closed in FIG. 3, the lateral access door is open and the probe is in operating position inside the housing of the closing device in FIG. 4, and the probe is partially and then completely extracted from the closing device in FIGS. 5 and 6.
Figure 4:
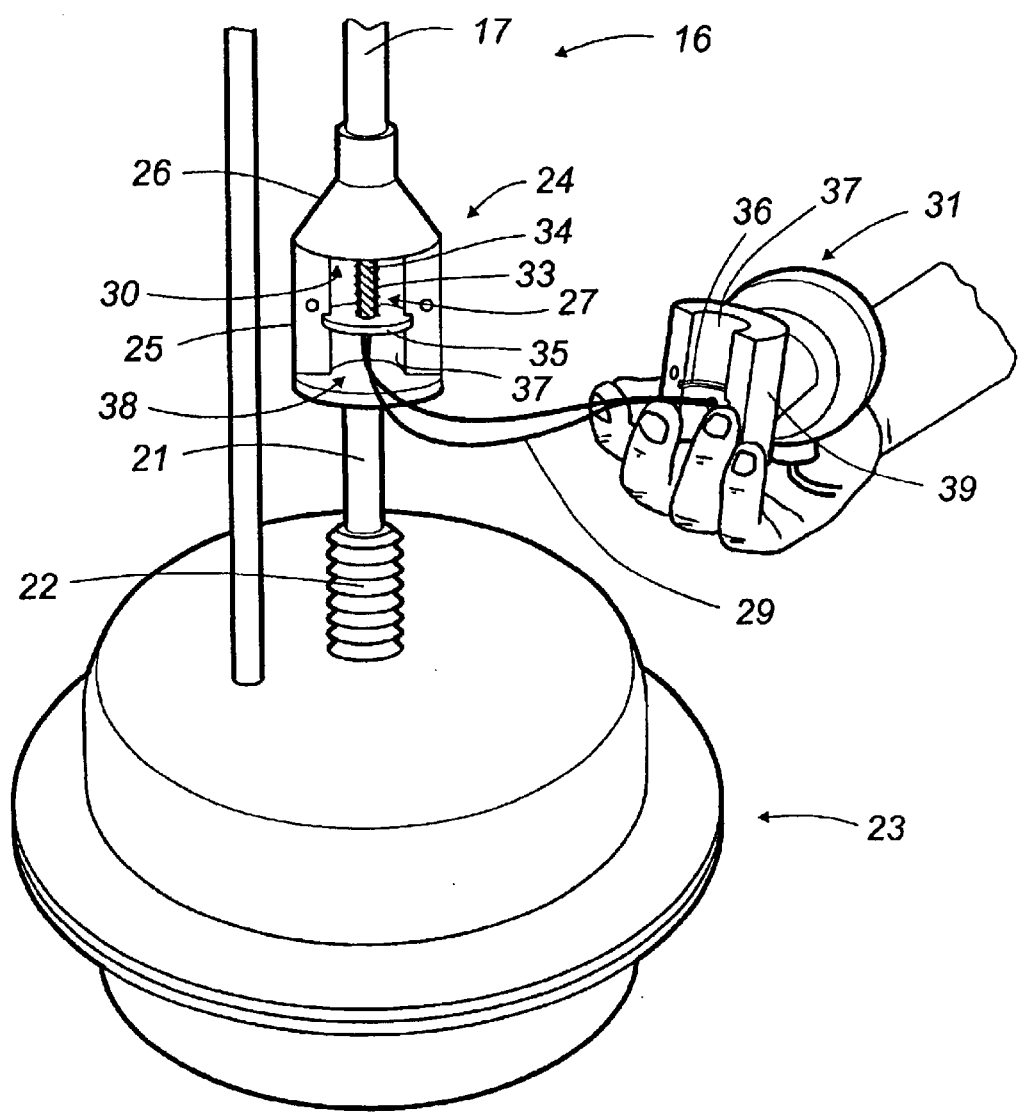

When it is in the closing position shown in FIGS. 1 and 2, blocking head 18 contacts the upper portion of a valve seating 19 interposed between reactor opening 13 and body 15 of the drainage valve, thereby tightly sealing drainage valve 14 of reactor 1.

Valve seating 19 may be made of a fluoro polymer such as a Teflon-coated material, preferably solid glass-coated Teflon or reinforced Teflon. This makes it resistant to the corrosive environment and ensures that when it is pressed, it forms a perfect seal when the blocking head of the movable closing device, in the lower position, abuts it.

When in the upper opening position, not shown, blocking head 18 of movable closing device 16 is displaced upward, thereby forming an exhaust outlet for liquid 8 inside reactor 1 which passes along seating 19, then body 15 of valve 14 to evacuation orifice 20.

For safety reasons, drainage valve 14 may have a faucet, not shown, located upstream of closing device 16 of the invention.

The closing device is displaced between the open and closed positions by the action of a piston 21 connected through a bellows 22 to a pneumatic or other type of activator 23.

The shafts of closing device 16 and piston 21 of activator 23 extend out from each other and are joined by a coupling element 24 at the base of shaft 17 of closing device 16. This coupling element 24 preferably has a generally cylindrical lower portion 25 extending into a generally conical upper portion 26.

For technical or design reasons, the shaft of activator piston 21 is not necessarily aligned with the shaft of closing device 16. It may be slightly off-center or pushed back. Likewise, the activator may be driven by some type of energy that is not necessarily pneumatic.

In order to measure the temperature of reactive environment 8, reactor 1 is equipped with a temperature measurement probe 27 comprising a thermosensitive device 28, for example, a thermocouple or other thermosensitive element, connected by conductive wires 29 to a measurement apparatus (not shown) located outside the reactor.

Either a detector or a detector sensor can be used.

A probe or detector 27 is placed in a hollow opening 30 formed inside the closing device 16, with the thermosensitive element 28 located inside blocking head 18 and conductive wires 29 passing through shaft 17 of closing device 16.

Conductive wires 29 pass through shaft 17 of closing device 16, through coupling 24, and then through a connector block which is preferably transversely connected to the coupling 24. This connector block 31 is used to form the various electrical or other types of connection between the internal reactor devices and those outside the reactor. In particular, it is used to join conductive wires 29 on probe or detector 27 to the wires from the temperature measurement apparatus. Connector block 31 can be opened to facilitate connection.

Since the probe or detector 27 is a contact temperature measurement device, sensor 28 is positioned against the internal surface of upper wall 32 of the blocking head 18 of the closing device, preferably near an area of the wall that is progressively reduced in thickness.

Housing 30 is designed to maintain probe 27 in position for measurement or detection and it may have some type of support for that purpose.

In the embodiment shown, sensor 28 extends into a flexible casing 33, and wires 29 pass through the interior of the casing. This casing consists of a compressible spring coil 34 terminating in a generally circular contact ring 35.

When probe 27 is positioned within interior housing 30 of closing device 16, this flexible casing 33 extends along essentially the entire length of shaft 17 of the closing device. Contact ring 35 may then engage in a groove 36 formed in the lateral wall of interior housing 30, preferably in the lateral interior wall 37 of coupling 24.

The length of casing 33, as well as the shape and dimension of contact ring 35 and groove 36 are such that contact ring 35 and groove 36 cooperate to maintain probe 27 inside housing 30 and to ensure that sensor 28 remains in place against upper wall 32 of blocking head 18 of the closing device due to the elastic compression of spirals 34 on casing 33 or of a spring with connected spirals.

According to the invention, closing device 16 has an opening 38 for lateral access to its interior housing 30. This access opening 38 is located in an area of closing device 16 that is accessible when that device is in the operating position inside valve 14. In this preferential embodiment, said opening 38 is formed near coupling 24 located at the base of shaft 17 of the closing device.

Advantageously, opening 38 may be temporarily blocked when not in use. In the exemplary embodiment shown, access opening 38 is blocked by a door 39 integral with coupling 24 and removable using screw 40.

The closing device of the invention makes it possible for probe 27 to be easily placed inside or removed from interior housing 30 without the necessity of removing drainage valve 14 and its closing device 16 and without releasing the seal formed by the valve. The various steps in extracting probe 27 have been represented schematically in FIGS. 3 through 6.

To extract probe 27, first it is necessary merely to unscrew screws 40 and retract door 39, freeing lateral access opening 38 in coupling 24. This is the stage shown in FIG. 4, where access has been gained to the lower portion of interior housing 30 of closing device 16.

Preferably connector block 31 is connected to coupling 24 near its lateral door 39. Thus connector block is retracted simultaneously with door 39 so that conductive wires 29 can be more easily disconnected.

Contact ring 35 on probe 27 is then disengaged from circular groove 36 in interior lateral wall 37 of coupling 24. Spirals 34 on casing 33 become decompressed.

Figure 5:
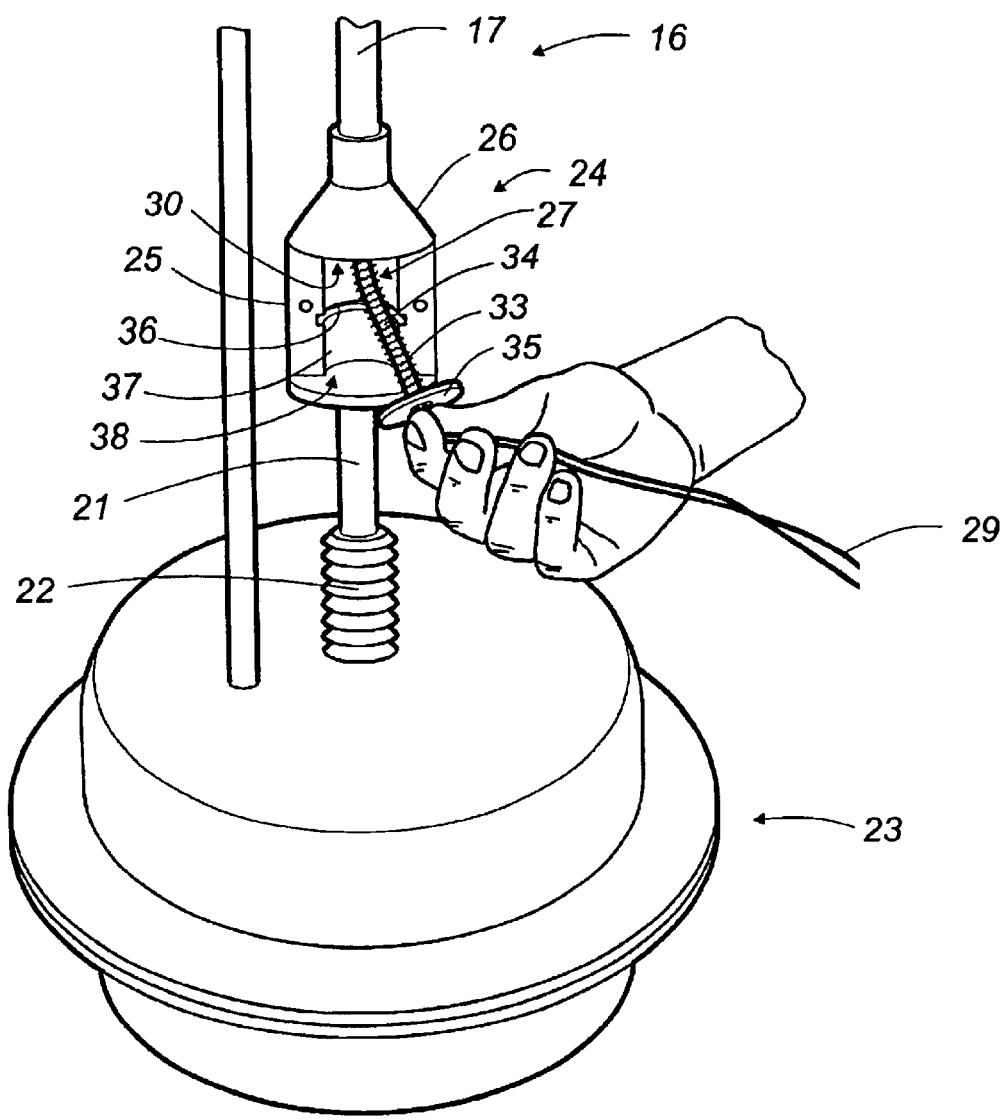

Because casing 33 is flexible, the lower portion of probe 27 can be extracted from coupling 24 as shown in FIG. 5. This operation is further facilitated by the preferred generally conical shape of upper portion 26 of coupling 24.

Figure 6:
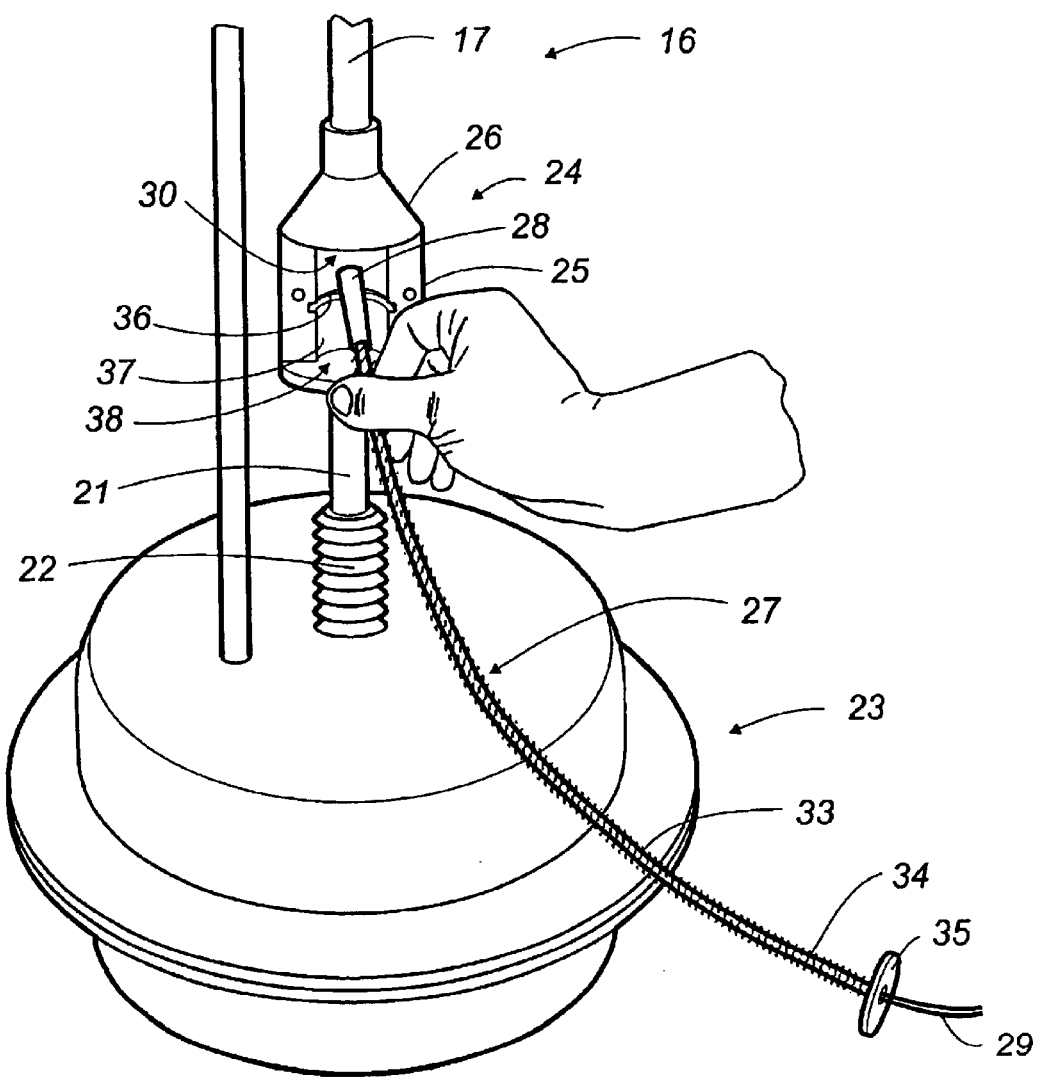

Next, it is only necessary to slide the probe inside interior housing 30 of closing device 16 until it is completely removed, as shown in FIG. 6.

The probe removal operation is thus very quick and easy. It does not require any significant disassembly, nor does it interfere in any way with the operation of the reactor or its drainage valve, which can be either open or closed.

Probe 27 is positioned the same way it is removed, by reversing the order of the preceding steps.

Flexible casing 33 must nevertheless be rigid enough so that probe 27 can progressively slide inside housing 30 in the closing device and also be immobilized when spirals 34 are compressed.

It is important to note that the invention is not limited to the embodiment previously shown and described.

The closing device of the invention may contain any type of measurement or detection probe, or any other thermosensitive element that must be periodically removed and replaced; interior housing 30 would then be adapted to that element.

The closing device can be attached to any type of valve, not just to drainage valves.

This valve may be used on any type of reactor, single or double-walled, serpentine, enameled or non-enameled, with any number of openings.

Likewise, the closing device of the invention is not limited to installation on chemical reactors, but may be used on any type of container such as, for example, a reservoir tank, a storage vat, a column, or the like, and in many varied fields and applications.

This invention relates not only to a thermosensitive probe, but to any type of sensor or detector, or any other element designed to furnish data. It could be used with a lens or an optical sensor for viewing the contents of a container.

What is claimed is:

1. A closing device for a valve (14) of a container, the closing device (16) being movable between a first open position to facilitate drainage through the valve and a second closed position which prevents flow through the valve (14), the closing device (18) houses one of a probe, a measurement detector (27) and a detection apparatus, and prevents the one of the probe, the measurement detector (27) and the detection apparatus from directly contacting contents of the container;

wherein the closing device (16) has an opening (38) formed in a lateral wall of the closing device (16), the opening (38) provides access to the interior of the closing device (16) and allows a probe, a measurement detector (27) and a detection apparatus to be inserted into or removed from the interior of closing device (16) without removal of either the valve or the closing device from the container end without altering the valve seal, and the opening (38) is accessible when the closing device (16) is in an operating position inside the valve.

2. The closing device according to claim 1, wherein the valve (14) is a drainage valve.

3. The closing device according to claim 1, wherein the closing device (16) comprises a shaft (17) supporting an enlarged blacking head (18) at a remote end of the shaft (17).

4. The closing device according to claim 3, wherein the one of the probe, the measurement detector (27) and the detection apparatus is a sensor element (28) located inside the blocking head (18), and, when the sensor element (28) is positioned inside the closing device (16), conductive wires (29) of the sensor element (28) pass through the shaft (17) of the closing element (16).

5. The closing device according to claim 4, wherein when the one of the probe, the measurement detector (27) and the detection apparatus is positioned inside the closing device (16) a remote end of the one of the probe, the measurement detector (27) and the detection apparatus abuts against an upper internal surface of a blocking head (18) of the closing device (16) for at least one of measuring and detecting a temperature inside the container.

6. The closing device according to claim 4, wherein the sensor element (28) extends through a flexible casing (33), with the wires (29) of the sensor element (28) pass through an interior of casing, and the casing (33) comprises a compressible spiral (34).

7. The closing device according to claim 6, wherein the casing (33) terminates with a contact ring (35).

8. The closing device according to claim 1, wherein a piston (21), controlled by an activator (23), displaces the closing device (16) from the open position to the closed position and from the dosed position to the open position.

9. The closing device according to claim 8, wherein a rod of the piston (21) of the activator (23) end a shaft (17) of the closing device (16) are interconnected by a coupling element (24).

10. The closing device according to claim 9, wherein the coupling element (24) has a generally cylindrical lower portion (25) and a generally conical upper portion (26).

11. The closing device according to claim 9, wherein the opening (38) formed in the closing crevice is located on the coupling element (24).

12. The closing device according to claim 1, wherein means temporarily blocks the opening (38) to prevent access thereto.

13. The closing device according to claim 1, wherein a door (39) temporarily blocks the opening (38) to prevent access thereto.

14. The closing device according to claim 13, wherein a connector block (31) is connected to the door (38) and the connector block (31) is removable with the door (39).

15. The closing device according to claim 1, Wherein the closing device (16) includes a support element (36) for maintaining the one of the probe, the measurement detector (27) and the detection apparatus in one of a measurement position and a detection position.

16. The closing device according to claim 15, wherein the support element is a groove (36) formed in an interior lateral wall of the closing device (16).

17. The closing device according to claim 6, wherein a contact ring (35) cooperates with the groove (36) of the closing device (16) to maintain the one of the probe, the measurement detector (27) end the detection apparatus inside the closing device (16) and to ensure that the one of the probe, the measurement detector (27) and the detection apparatus abuts against an upper wall (32) atm blocking head (18) of the closing device by elastic compression of a plurality of spirals (34) on a casing (33).

18. The closing device according to claim 1, wherein the one of the probe, the measurement detector (27) and the detection apparatus is a contact temperature measurement probe.

19. A closing device for a valve (14) of a container, the closing device (16) being movable between the first open position to facilitate drainage through the valve and a second closed position which prevents flow through the valve (14), the closing device (16) houses one of a probe, a measurement detector (27) and a detection apparatus, and prevents the one of the probe, the measurement detector (27) and the detection apparatus from contacting contents of the container;
wherein the closing device (16) comprises a shaft (17) which supports an enlarged blocking head (18) that accommodates a measurement end of the one of the probe, the measurement detector (27) and the detection apparatus, the closing device (16) has an opening (38) formed in a lateral wall of the shaft (17), the opening (38) provides access to the interior of the closing device (16) and allowing the one of the probe, the measurement detector (27) and the detection apparatus to be inserted into or removed from the interior of closing device (16) without removal of either the valve or the closing device from the container and without altering a seal between the enlarged blocking head (18) and a mating valve seat, and the opening (38) is accessible when the closing device (16) is in an operating position inside the valve.

20. A closing device for a valve (14) of a container, the closing device (16) being movable between a first open position to facilitate drainage through the valve and a second closed position which prevents flow through the valve (14) the closing device (16) houses one of a probe, a measurement detector (27) and a detection apparatus, and prevents the one of the probe, the measurements detector (27) and the detection apparatus from contacting contents of the container;
wherein the closing device (16) comprises a shaft (17) which supports an enlarged blocking head (18) that accommodates a measurement end of the one of the probe, the measurement detector (27) and the detection apparatus, the closing device (16) has an opening (38) formed in a lateral wall of the shaft (17), the opening (38) provides access to the interior of the closing device (16) and allowing the one of the probe, the measurement detector (27) and the detection apparatus to be inserted into or removed from the interior of closing device (16) without removal of either the valve or the closing device from the container and without altering a seal between the enlarged blocking head (18) and a mating valve seat, and the opening (38) is accessible when the closing device (16) is in an operating position inside the valve;
a portion of the shaft (17), which supports an enlarged blocking head (18) is located within an evacuation orifice (20) which facilitate drainage of the contents from the container; and
an activator (23) is provided along a longitudinal axis defined by the shaft (17) for displacing the closing device (16) from the open position to the closed position and from the closed position to the open position.

* * * * *